United States Patent
Bryla

(10) Patent No.: US 11,837,748 B2
(45) Date of Patent: Dec. 5, 2023

(54) ELECTROCHEMICAL CELL HOUSING

(71) Applicant: Sargent Manufacturing Company, New Haven, CT (US)

(72) Inventor: Mark Bryla, Cumming, GA (US)

(73) Assignee: Sargent Manufacturing Company, New Haven, CT (US)

( * ) Notice: Subject to any disclaimer, the term of this patent is extended or adjusted under 35 U.S.C. 154(b) by 130 days.

(21) Appl. No.: 17/149,329

(22) Filed: Jan. 14, 2021

(65) Prior Publication Data

US 2021/0135314 A1    May 6, 2021

Related U.S. Application Data

(62) Division of application No. 16/009,454, filed on Jun. 15, 2018, now Pat. No. 10,923,696.

(60) Provisional application No. 62/526,631, filed on Jun. 29, 2017.

(51) Int. Cl.
| | |
|---|---|
| *H01M 50/383* | (2021.01) |
| *H01M 50/30* | (2021.01) |
| *H01M 50/392* | (2021.01) |
| *H01M 50/342* | (2021.01) |
| *H01M 50/367* | (2021.01) |

(52) U.S. Cl.
CPC ..... *H01M 50/383* (2021.01); *H01M 50/3425* (2021.01); *H01M 50/367* (2021.01); *H01M 50/392* (2021.01); *H01M 50/394* (2021.01); *H01M 2200/20* (2013.01)

(58) Field of Classification Search
CPC ........... H01M 50/383; H01M 50/3425; H01M 50/35; H01M 50/392; H01M 50/394; H01M 2200/20; H01M 50/367; Y02E 60/10
See application file for complete search history.

(56) References Cited

U.S. PATENT DOCUMENTS

| | | | |
|---|---|---|---|
| 9,614,210 B2 * | 4/2017 | DeKeuster | ........ H01M 50/3425 |
| 10,923,696 B2 | 2/2021 | Bryla | |
| 2006/0166102 A1* | 7/2006 | Fujiwara | ........... H01M 10/0567 |
| | | | 429/326 |

(Continued)

FOREIGN PATENT DOCUMENTS

| | | | | |
|---|---|---|---|---|
| JP | 2005322434 | * | 11/2005 | ............. H01M 2/10 |
| WO | WO2014/053623 | * | 4/2014 | ............. H01M 2/02 |

(Continued)

OTHER PUBLICATIONS

International Search Report and Written Opinion for International Application No. PCT/US2018/037706, dated Aug. 30, 2018.

(Continued)

*Primary Examiner* — Helen Oi K Conley
(74) *Attorney, Agent, or Firm* — Wolf, Greenfield & Sacks, P.C.

(57) ABSTRACT

Systems and methods for controlling the emission of gases and/or flames emitted from one or more electrochemical cells are disclosed. In one exemplary embodiment, gas emitted from an electrochemical cell located within an interior of an enclosure may be flowed through a flow restriction to reduce a pressure and/or temperature of the gas and/or the gas may be flowed through a catalyst prior to exiting through an outlet of the enclosure.

17 Claims, 2 Drawing Sheets

(56) References Cited

U.S. PATENT DOCUMENTS

| | | | |
|---|---|---|---|
| 2008/0305388 A1* | 12/2008 | Haussman | H01M 10/613 |
| | | | 429/120 |
| 2010/0159317 A1 | 6/2010 | Taghikhani et al. | |
| 2010/0255359 A1* | 10/2010 | Hirakawa | H01M 50/30 |
| | | | 429/120 |
| 2016/0093857 A1 | 3/2016 | DeKeuster et al. | |
| 2019/0006650 A1 | 1/2019 | Bryla | |

FOREIGN PATENT DOCUMENTS

| WO | WO 2014/053623 A2 | 4/2014 |
| WO | WO 2016/026051 A1 | 2/2016 |
| WO | WO 2017/106349 A1 | 6/2017 |

OTHER PUBLICATIONS

PCT/US2018/037706, Aug. 30, 2018, International Search Report and Written Opinion.

\* cited by examiner

ELECTROCHEMICAL CELL HOUSING

RELATED APPLICATIONS

This Application is a divisional of U.S. application Ser. No. 16/009,454, filed Jun. 15, 2018, which claims the benefit under 35 U.S.C. § 119(e) of U.S. Provisional Application Ser. No. 62/526,631, filed on Jun. 29, 2017, the contents of each of which are incorporated by reference in their entirety.

FIELD

Disclosed embodiments are related to electrochemical cell housings.

BACKGROUND

Electrochemical cells are oftentimes assembled into module and/or pack assemblies within an external electrochemical cell housing. The enclosure may be used to provide structural rigidity and protection to the one or more electrochemical cells contained therein and/or to provide a desired form factor for an overall battery unit.

SUMMARY

In one embodiment, an electrochemical cell housing includes an enclosure having an interior chamber constructed and arranged to receive at least one electrochemical cell, an outlet formed in the enclosure, and at least one flow restriction. The at least one flow restriction is constructed and arranged to allow gas emitted from the at least one electrochemical cell to flow from the interior chamber through the at least one flow restriction to the outlet.

In another embodiment, an electrochemical cell housing includes an enclosure having an interior chamber constructed and arranged to receive at least one electrochemical cell, an outlet formed in the enclosure, and at least one catalyst. The at least one catalyst is constructed and arranged to allow gas emitted from the at least one electrochemical cell to flow from the interior chamber through the at least one catalyst to the outlet.

In yet another embodiment, a method of mitigating a venting and/or thermal runaway event of an electrochemical cell includes: flowing gas emitted from the electrochemical cell through a flow restriction to reduce a pressure and temperature of the gas; and flowing the gas at the reduced pressure and temperature through an outlet of an enclosure that the electrochemical cell is located in.

In still another embodiment, a method of mitigating a venting and/or thermal runaway event of an electrochemical cell includes: flowing gas emitted from the electrochemical cell through at least one catalyst; and flowing the gas through an outlet of an enclosure that the electrochemical cell is located in after passing the gas through the at least one catalyst.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
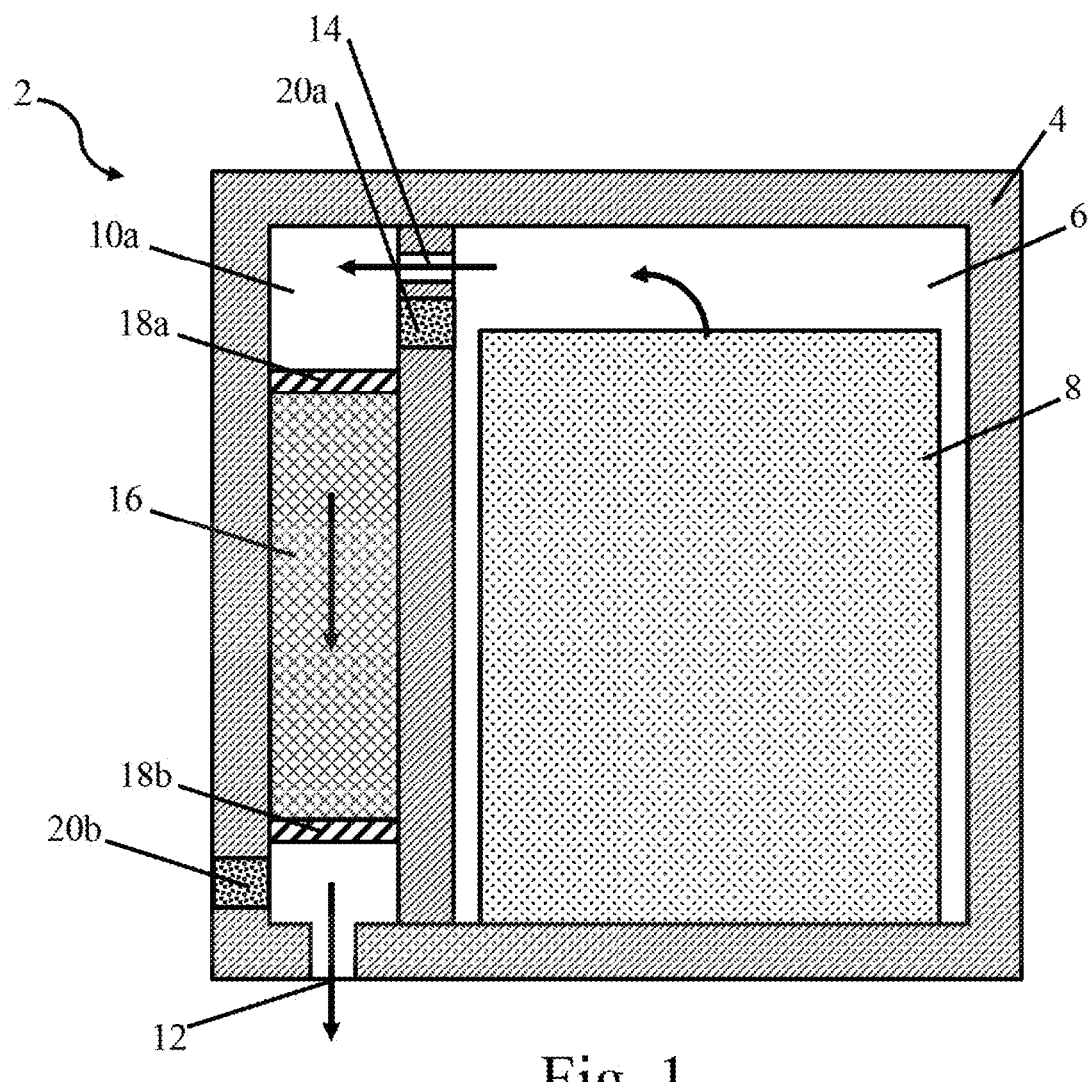
FIG. 1 is a schematic of one embodiment of an electrochemical cell enclosure.

Electrochemical cells, such as lithium ion based electrochemical cells, can emit various high temperatures volatile gases, sparks, and flames during events, such as thermal runaway events, which may be initiated by a variety of events including, but not limited to, excessive temperatures, structural damage, dendritic growth, and overcharging events to name a few. Additionally, due to the use of electroactive materials that include oxygen, the decomposing electroactive materials may release oxygen during these events as well. Therefore, even within sealed compartments, the released gases may support combustion under these conditions, and if not controlled may result in the release of high temperature gases and/or flames from the electrochemical cells onto surrounding components. In applications where multiple assemblies of electrochemical cells are used, these gases and/or flames may cause heating and subsequent thermal runaway of the other electrochemical cells, i.e. thermal runaway propagation, in a system.

In view of the above, the Inventors have recognized that it may be desirable to help mitigate the release of hot gases and/or flames from a system including electrochemical cells through the use of one or more safety features included in a housing constructed to receive the electrochemical cells. For example, the Inventors have recognized the benefits associated with reducing the temperature and/or pressure of gases prior to the gas exiting from an outlet of an associated electrochemical cell enclosure of a housing. By reducing the gas temperature and/or pressure, the presence of flames may be suppressed and temperatures experienced by components directly in the path of the released gases may also be reduced. The Inventors have also recognized the benefits associated with reacting the gas with a catalyst to remove one or more of the components within the gas that are either volatile, reactive, and/or toxic prior to releasing the gas from the associated enclosure. As detailed further below, it should be understood that these concepts may either be used individually and/or in combination with one another. Additionally, while specific benefits have been noted above, other types of benefits associated with these types of constructions and methods are also possible as the disclosure is not limited in this regard.

In one embodiment, an electrochemical cell housing includes an enclosure with an interior chamber that is constructed and arranged to receive one or more electrochemical cells . The enclosure may be constructed and arranged to withstand pressures generated during release and/or combustion of gases from the one or more electrochemical cells located within the interior chamber. In order to reduce a temperature and/or pressure of the gas located within the interior chamber, the gas may flow from the interior chamber of the enclosure through at least one or more flow restrictions prior to flowing out of an outlet formed in the enclosure. Flowing the gas through the one or more flow restrictions may cause a pressure of the gas to be lowered to a second lower pressure. This reduction in pressure may result in a corresponding reduction in a temperature of the gas from a first temperature in the interior chamber of the enclosure to a second lower temperature within the flow path once the gas has passed through the one or more flow restrictions. The gas may then flow out of the outlet at the second lower temperature.

In the above noted embodiment, the various portions of an enclosure, including the interior chamber containing the one or more electrochemical cells, may be constructed and arranged to support the expected elevated pressures resulting from the release and possible combustion of gases within the enclosure. It should be understood that considerations that may be used to appropriately construct the enclosure to support these pressures during an event include, but are not limited to appropriate combinations of material strengths, wall thicknesses, reinforcing structures, precompression of components, external enclosure supports, and other suitable construction arrangements as would be appreciated by one of skill in the art.

Depending on the particular embodiment, an enclosure may be constructed and arranged to withstand pressures within an interior chamber of the enclosure during an event that are greater than or equal to 50 psi, 75 psi, 100 psi, 125 psi, 150 psi, or any other appropriate pressure. Correspondingly, an enclosure may be constructed to withstand a pressure that is less than or equal to 200 psi, 150 psi, 125 psi, 100 psi, or any other appropriate pressure. Combinations of the above pressure ranges are contemplated including, for example, pressures between or equal to about 50 psi and 200 psi. Of course, it should be understood that a pressure of gases within the interior chamber during an event will be a function of the cell size, interior chamber volume, cell electrochemistry being used, and the type of event that occurs. Accordingly, an enclosure may be constructed to handle pressures both greater than and less than those noted above as the current disclosure is not so limited.

In some embodiments, a pressure of a gas passing from an interior chamber of an enclosure through one or more flow restrictions, and ultimately out of an outlet of the enclosure, may be reduced in pressure by a factor of greater than or equal to 2, 5, 10, or any other appropriate factor. Correspondingly, the pressure may be reduced by a factor that is less than or equal to 15, 10, 5, or any other appropriate factor. Combinations of the above ranges are contemplated including, for example, a gas that is reduced in pressure by a factor that is between or equal to about 5 and 20, 5 and 15, or any other appropriate range.

The above noted reductions in pressure may lead to final pressures released from an outlet of an enclosure that is less than or equal to about 30 psi, 20 psi, 15 psi, or any other appropriate pressure. Correspondingly, a final pressure released from the outlet of the enclosure may be greater than or equal to about 1 atm (14.7 psi), 15 psi, 20 psi, and/or any other appropriate pressure. Combinations of the above ranges of pressures may be used including, for example, a pressure that is between or equal to about 15 psi and 30 psi.

It should be noted that the while specific combinations of factors of pressure reduction and pressure ranges are listed above, the currently disclosed systems may be configured to provide any desired range of pressure reduction and final absolute pressure as the disclosure is not so limited. Accordingly, pressures and reduction factors both greater and less than those noted above are contemplated as the disclosure is not so limited.

In addition to the above, it should be understood that any appropriate type of flow restriction may be used with the currently disclosed enclosures. For example appropriate types of restrictions include, but are not limited to, an orifice with a reduced diameter relative to other portions of a flow path, a flow control valve configured to regulate the pressure drop across the valve, and/or any other appropriate type of flow restriction as the disclosure is not so limited. The flow restriction may include a fixed orifice (which may be considered a restrictor), a variable orifice (such as that provided by a variable valve), or a self-regulating orifice (such as that provided by a self-regulating valve). In one specific embodiment, a path between an interior chamber an enclosure and an outlet may include one or more flow restrictions with an inner diameter between or equal to about 0.020 inches and 0.030 inches. Of course, flow restrictions and flow paths with different dimensions both larger and smaller than those noted above are also contemplated as the disclosure is not so limited.

Depending on the particular embodiment, the one or more flow restrictions used in an enclosure may be constructed and arranged such that a final temperature of a gas released from an electrochemical cell contained therein may be reduced by a factor that is greater than or equal to 2, 3, 4, 5, or any other appropriate factor relative to a temperature of the gas within the interior chamber. Correspondingly, a temperature of the released gas may be reduced by a factor that is less than or equal to 5, 4, 3, or any other appropriate factor relative to the temperature of the gas within the interior chamber. Combinations of the above ranges are contemplated including, for example, a temperature of a gas that passes from an interior of the enclosure to the outlet may be reduced by a factor that is between or equal to about 2 and 5. This may lead to a final temperature of gases exiting an outlet of the enclosure that are less than the auto-ignition temperatures of the one or more components of the gas vented from the electrochemical cells. Typical gases that may be vented from electrochemical cells include, but are not limited to, $H_2$, $CH_4$, $C_2H_4$, $C_2H_2$, $C_3H_6$, $C_2H_6$, $C_4H_8$, $C_3H_8$, and $C_4H_{10}$. In view of these gases and their auto-ignition temperatures, in some embodiments, an absolute temperature of the gases exiting an outlet of an enclosure may be less than or equal to 300° C., 200° C., 100° C., or any other appropriate temperature. Of course the currently disclosed systems are not limited to any particular reduction in temperature and/or absolute temperature of gases exiting the system. Accordingly, embodiments in which a temperature of a gas is reduced by a factor, and/or has an absolute temperature, that is greater than or less than those noted above are also contemplated as the disclosure is not so limited.

In addition to the above, the Inventors have recognized the benefits associated with removing one or more reactive, volatile, and/or toxic components of a gas vented from an electrochemical cell prior to it exiting an associated enclosure. Correspondingly, in at least some embodiments, a gas released from one or more electrochemical cells located within an interior chamber of an enclosure of an electrochemical cell housing may be flowed from the interior chamber through one or more catalysts prior to exiting through an outlet of the enclosure. As the gas is flowed through the one or more catalysts, one or more components of the gas may react with the material of the catalyst to remove the components from the gas. The gas may then flow from the catalyst to an outlet from the enclosure.

Depending on the particular component to be removed from the gas, different types of catalyst materials may be used. For example, in embodiments in which lithium ion based electrochemical cells are used, a catalytic material that is reactive with lithium may be selected to react with, and thus remove, lithium from the gas prior to it exiting the enclosure. Appropriate materials may include, but are not limited to, copper, tellerium, sodium carbonate, potassium carbonate, powdered graphite, or any other catalyst material capable of extracting lithium or any other desirable component of the gas released from the one or more electrochemical cells.

In addition to the above, in some applications, it may be desirable to increase the surface area of the catalyst available for reacting with the gas to more fully extract the desired component from the gas. Accordingly, in some embodiments, a catalyst may be a high surface area catalyst provided in the form of a mesh, powder, wool, honeycomb, sintered catalyst, or any other appropriate form factor.

In some embodiments, it may be desirable to avoid oxidation and/or corrosion of a catalyst prior to use during an event in which gases are released from one or more electrochemical cells. In such an embodiment, a catalyst located within an enclosure may be sealed, i.e. isolated, under a non-oxidizing atmosphere. Appropriate non-oxidizing atmospheres may include, but are not limited to, nitrogen, argon, helium, neon, combinations of the above, or any other appropriate atmosphere that does not form a passivation layer on the catalyst. As described further below in regards to the figures, the catalyst may be sealed under the desired atmosphere in any appropriate way including, seals formed on either end of the catalyst located within a flow channel and/or by encapsulating the catalyst in a sealing layer prior to locating the catalyst within a flow channel of the enclosure. Appropriate materials for sealing the catalyst include, but are not limited to: metallic foils; polymeric films formed from polyvinyl alcohol, polyacrylonitrile, ethylene: vinyl alcohol, cellophane, polyvinyl chloride, polyethylene, and other appropriate polymers; and/or any other appropriate material capable of acting as a barrier to oxygen passing through the seal to the catalyst prior to use.

Depending on the particular embodiment, the seals associated with the catalyst may be ruptured in any number of ways during an event where gases are released from an electrochemical cell. For example, a thickness of the seal and corresponding material strength (i.e. tensile strength) may be selected such that an expected pressure within the flow channel during an event is sufficient to rupture (i.e. break) the seal. Alternatively, in embodiments in which a thermoplastic polymeric seal is used, the gases emitted by the electrochemical cell may have a temperature above a glass transition temperature of the polymeric seal. Accordingly, the polymeric seal may plastically flow until it ruptures under this combination of elevated temperature and pressure. While two possible constructions of a rupturable seal have been disclosed above, it should be understood that the seals associated with the one or more catalysts may be constructed and arranged to rupture in any appropriate manner during an event as the disclosure is not limited to any particular type of seal construction.

It should be understood that the enclosures and other features described herein may be used with any appropriate type of electrochemical cell. However in one particular embodiment, the electrochemical cells used with the systems and methods described herein may be lithium ion electrochemical cells. Other appropriate types of electrochemical cells that may be used include, but are not limited to, nickel metal hydride, lithium metal, magnesium ion, or other appropriate types of electrochemical cell. Additionally, appropriate types of form factors for an electrochemical cell that may be used with the systems and methods described herein include, but are not limited to, prismatic cells, pouch cells, jelly rolls, or any other appropriate type of form factor as the disclosure is not so limited. Additionally, the electrochemical cells may correspond to primary batteries, secondary batteries, super capacitors, and/or any other appropriate type of electrochemical cell as the disclosure is not limited in this fashion either.

For the sake of clarity, the various embodiments described in the figures below include both a catalyst and one or more restrictions to reduce a pressure and corresponding temperature of gases emitted from an electrochemical cell. However, it should be understood that these concepts of using catalysts and/or flow restrictions within an electrochemical cell enclosure may be used either individually and/or in combination as the disclosure is not so limited.

Turning now to the figures, several nonlimiting embodiments are described in further detail. However, it should be understood that the various components, features, and methods of operation described in reference to the figures may be used either individually and/or in any appropriate combination.

FIG. 1 depicts one embodiment of an electrochemical cell housing 2 including an enclosure 4 that includes one or more interior chambers 6 located therein. The one or more interior chambers may be sized and arranged to contain and support one or more electrochemical cells 8 therein for use in a corresponding system. The enclosure includes one or more flow restrictions 14 that are located along at least a first flow path 10a that fluidly couples the interior chamber with an outlet 12 of the enclosure. In the depicted embodiment, the interior chamber is in fluid communication with the first flow path 10a through a flow restriction 14. However, the flow restriction may be located at any position along a length of the flow path. Additionally, while the flow path has been depicted as a channel formed by one or more walls of the enclosure, the flow path may also be embodied as a tube, duct, or any other appropriate type of conduit capable of directing the flow of gas through the enclosure.

As discussed above, the one or more electrochemical cells may vent gases into the interior chamber 6 of an enclosure 4 during different types of standard testing and/or during various types of failures including thermal runaway events. In the depicted embodiment, as the gases are vented into the interior chamber, the temperature and pressure of the gas within the interior chamber increases. As the gas passes through the flow restriction 14, a temperature and pressure of the gas may be lowered due to expansion of the gas through the flow restriction. Therefore, a temperature and pressure of the gas within a portion of the first flow path downstream from the flow restriction may be lower than a corresponding temperature and pressure of the gas within a portion of the first flow path upstream from the flow restriction and/or within the interior chamber. The gas may then flow through the first flow path to an outlet 12 that is fluidly connected to a downstream portion of the first flow path.

As depicted in the figure, in some embodiments, the outlet 12 may include an additional flow restriction, i.e. narrowing, relative to an associated portion of the first flow path 10a to further reduce a pressure and corresponding temperature of the gas emitted from the enclosure 4. However, embodiments in which the outlet does not include a flow restriction are also contemplated. Alternatively, one or more additional flow restrictions may be included along a different portion of the flow path between the first flow restriction and the outlet.

In some embodiments, the enclosure may also include a catalyst 16 located along a portion of the first flow path 10a to remove one or more components from the gas as previously described. Therefore, the gas flowing through the first flow path flows from the interior chamber 6 and through the catalyst prior to passing out of an outlet 12 the first flow path is in fluid communication with. Thus, the gas exiting through the outlet may be substantially free from, or at least show a reduced concentration of, the components of the gas the catalyst reacts with.

Figure 3:
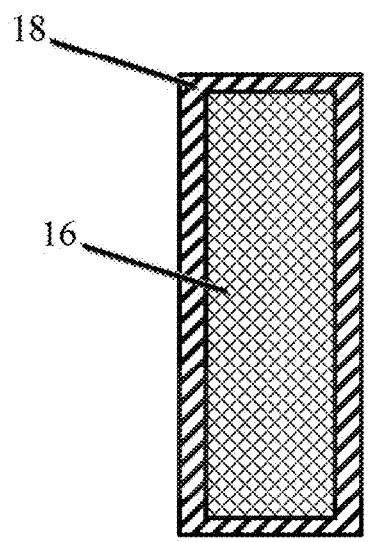
FIG. 3 is a schematic of another embodiment of an electrochemical cell enclosure.

In embodiments where a particular catalyst 16 to be used may be subject to corrosion, oxidation, and/or passivation, the system may include one or more seals 18a and 18b that are used to seal the catalyst 16 under a non-oxidizing atmosphere within the enclosure 4. In the depicted embodiment, the seals are formed on opposing upstream and downstream portions of the flow path located on either side of the catalyst. However, other configurations may also be used to seal the catalyst within an enclosure. For example, as depicted in FIG. 3, a catalyst 16, may be fully encapsulated within a desired type of seal 18, such as a desired polymeric sealing layer. Such a construction may help simplify assembly of a system since the catalyst may be sealed prior to assembly in the enclosure. Therefore, while a catalyst has been depicted in the figure with seals located on opposing ends of the catalyst to form an isolated portion of the flow path, other configurations are also possible as the disclosure is not so limited.

In embodiments where a sealed catalyst 16 is used, as gas passes into the first flow path 10a during an event, the pressure and/or temperature within the first flow path may continue to increase due to it being unable to pass through the sealed catalyst. However, once the pressure and/or temperature exceed a predetermined threshold, the one or more seals 18a and 18b depicted in FIG. 1 may rupture. Once the seals are ruptured, the portions of the first flow path located on opposing sides of the catalyst are placed in fluid communication with one another, and the gas is permitted to flow through the catalyst and first flow path toward an outlet 12 of the enclosure in fluid communication with the first flow path.

As noted above, an enclosure 4 containing one or more electrochemical cells 8 may include a flow path extending from an interior chamber 6 of the enclosure to an outlet 12 of the enclosure. However, in some embodiment, it may be desirable to alter a direction of flow of the gas exiting from the one or more electrochemical cells to help suppress and/or redirect flames generated within the enclosure. One specific embodiment of such as system is detailed further below.

As depicted in FIG. 1, an enclosure may include at least a first flow path 10a that follows a tortuous path that changes direction at least once, twice, or any other appropriate number of times between the interior chamber and outlet of the enclosure. For example, in the figure, a flow of gases are emitted from the one or more electrochemical cells 8 in a first venting direction as indicated by the arrow within the interior chamber 6. This initial venting direction of the electrochemical cells may correspond to a predetermined venting direction due to the inclusion of a various types of safety vents and gas directing structures integrated with may types of electrochemical cells. The flow of gas from the one or more electrochemical cells 8 may be redirected by a wall of the interior chamber 6 towards an inlet to the first flow path 10a, which in this particular embodiment, is a flow restriction 14. As shown in the figure, the flow restriction and first flow path is offset from both the location and initial direction of gas vented from the one or more electrochemical cells. The first flow path 10a then redirects the gas to flow in a direction that is substantially opposite the venting direction of the electrochemical cells. The gas then flows through the first flow path in this direction until it eventually exits the enclosure through outlet 12.

While a particular combination of flow path directions has been described above, other embodiments that redirect the flow of gas in different combinations of directions within an enclosure are also contemplated. For example, a flow path extending from an interior chamber of an enclosure towards an outlet of the enclosure may redirect the flow of gas any number of times and in any number of directions including directions that are orthogonal, parallel, opposite, or any other appropriate direction relative to an initial venting direction of the electrochemical cells. Additionally, embodiments in which a flow path is in line with and/or parallel to a predetermined venting direction of the one or more electrochemical cells are also contemplated as the disclosure is not limited to any particular shape or arrangement of the flow paths within an enclosure.

In some embodiments, it may be desirable to include one or more safety vents within the enclosure. For example, as depicted in the figure, a safety vent 20a may be located between the interior chamber 6 and first flow path 10a. A second safety vent 20b may be located between the first flow path and an exterior of the enclosure 4. These safety vents may be constructed and arranged to open above a preselected threshold pressure. In instances where one or more seals are used within the system, the threshold pressure of the safety vents may be greater than the designed rupture pressures of the associated seals and below a designed pressure rating of the enclosure. Accordingly, during operation, if excessive pressures are generated within the interior chamber and/or along the associated flow paths, the one or more safety vents may be opened creating additional flow paths from the interior chamber to the first flow path and/or from the first flow path to an exterior of the enclosure to reduce the pressures within the closure.

While safety vents have been depicted in particular locations in the above embodiment, it should be understood that safety vents may be located in any appropriate portion of the enclosure as the disclosure is not so limited. Additionally, to help prevent the direct emission of gases and/or flames from an enclosure containing an electrochemical cell, in some embodiments, it may be desirable to offset the one or more safety vents from a location and/or initial predetermined venting direction of the electrochemical cells. For example, as described previously, many types of electrochemical cells include preformed venting structures that operate above a threshold pressure to direct the gases and/or flames emitted from the electrochemical cell in a particular direction. Therefore, as depicted in the figure, a safety vent associated with the interior chamber including the electrochemical cells may be located in a portion of the interior chamber away from the predetermined direction the electrochemical cells are expected to vent in as indicated by the arrows.

Figure 2:
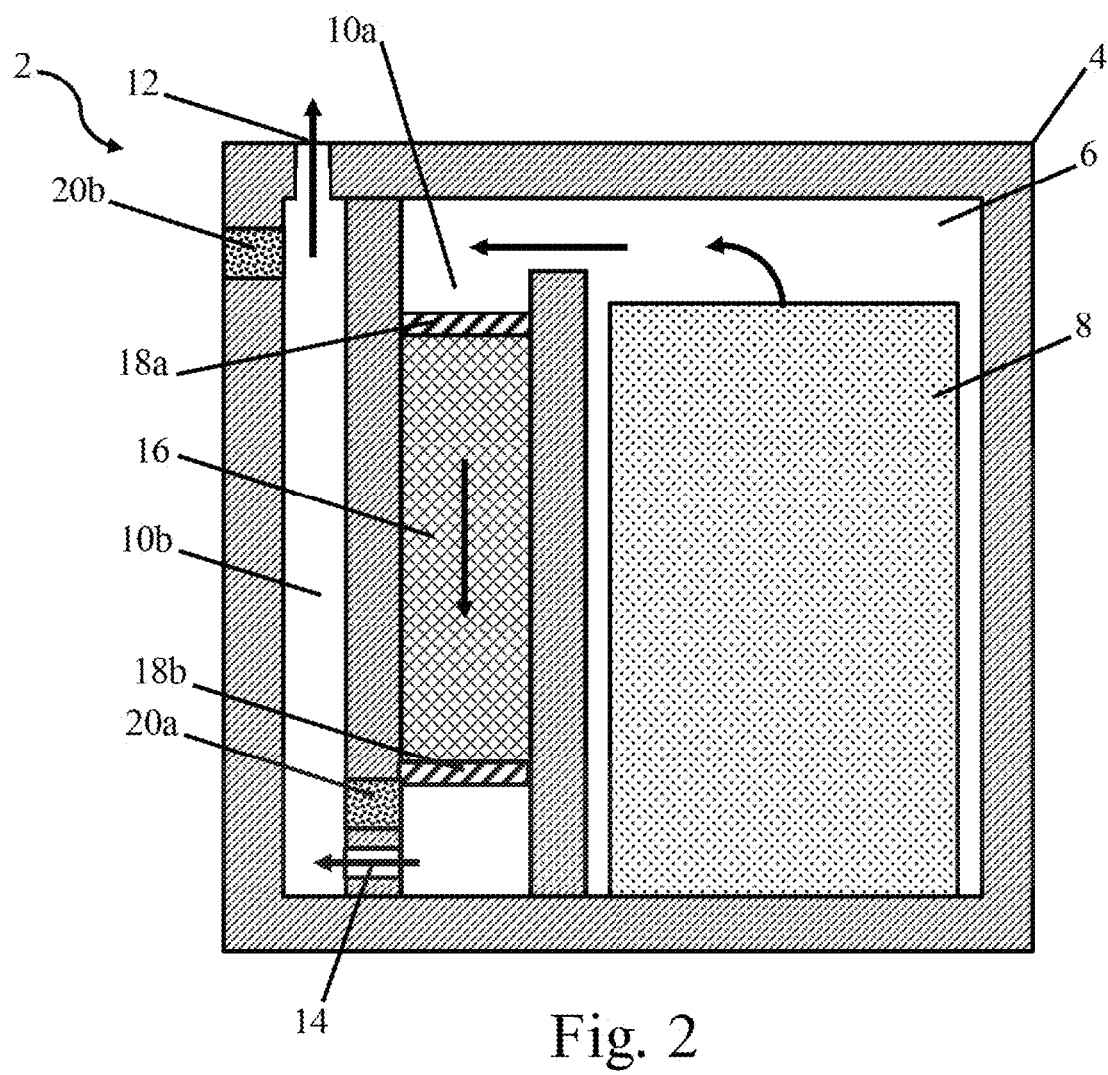
FIG. 2 is a schematic of one embodiment of an encapsulated catalyst.

The embodiment described above relative to FIG. 1 included a combination of a flow restriction, catalyst, and outlet where gases emitted from one or more electrochemical cells passed through the flow restriction prior to passing through the catalyst. Thus, the catalyst may be viewed as being located downstream from the one or more flow restrictions. However, embodiments in which one or more catalysts are located upstream from one or more flow restrictions, between two or more flow restrictions, and/or are integrated with a flow restriction are also contemplated. For example, as depicted in FIG. 2, an electrochemical cell housing 2 may include an enclosure 4 with an interior chamber 6 and one or more electrochemical cells 8 contained therein as previously described. The enclosure may also include a first flow path 10a in fluid communication with the interior chamber. The first flow path includes one or more catalysts 16 and associated seals 18a and 18b located along a length of the first flow path. The first flow path is then in fluid communication with a second flow path 10b through one or more flow restrictions 14. The second flow path 10b is in fluid communication with an outlet 12 of the enclosure. Similar to the above, the outlet may also include a flow restriction in some embodiments.

In the embodiment of FIG. 2, gas is initially vented from the one or more electrochemical cells 8 within the interior chamber 6. The gas is directed within the interior chamber towards the first flow path 10a which is in fluid communication with the interior chamber. The gas pressure and temperature within the first flow path increases until one or more seals 18a and 18b associated with the catalyst 16 located along the first flow path rupture. The gas then flows through the catalyst and one or more flow restrictions 14 to the second flow path 10b. The gas then flows through the second flow path towards an associated outlet 12 and an exterior of the enclosure.

Similar to the previous embodiment, the embodiment of FIG. 2 may include one or more safety vents 20 as previously discussed. In this particular embodiment, the safety vents provide selective fluid communication between the first and second flow paths 10a and 10b and between the second flow path and an exterior of the enclosure 4. The safety vent associated with the first and second flow paths may be located either upstream and/or downstream from a catalyst 16 located along the first flow path. Additionally, while the safety vents have been depicted in specific positions in this embodiment, the safety vents may be located in other positions within the enclosure as well since the disclosure is not so limited.

Example: Cooling

Without wishing to be bound by theory, when gases vented from an electrochemical cell are depressurized through one or more flow restrictions, the resulting cooling may be modeled for exemplary purposes as an isentropic process as indicated by the below equations.

$$T_2 = T_1 \left(\frac{P_2}{P_1}\right)^{\frac{k-1}{k}}$$

In the above equations $T_1$ and $P_1$ as well as $T_2$ and $P_2$ are the temperature and pressure in the pressurized interior chamber and at the outlet respectively. A common electrolyte used in lithium-ion batteries is dimethyl carbonate which, for purposes of this example, may be assumed to have a specific heat ratio approximately equivalent to air (k=1.4) when it is in the gaseous state during a venting process. As indicated in the equations below, an enclosure may be design such that pressure of gases within the interior chamber of an enclosure are reduced by a factor of 10 by the time they exit an outlet of the enclosure (i.e. $P_1$=10$P_2$). For example, this may correspond to a pressure change from about 150 psi to 15 psi. Thus, the equation may be rewritten as:

$$T_2 = T_1 \left(\frac{P_2}{10P_2}\right)^{\frac{1.4-1}{1.4}}$$

This equation may be further simplified to:

$$T_2 \cong 0.51 T_1$$

In view of the above, lowering the pressure of a vented gas by a factor of 10 may result in the temperature at an outlet of an enclosure being correspondingly reduced approximately by a factor of 2 (e.g. the temperature of the gas is approximately halved). Accordingly, reducing a pressure of vented gases is a viable method for reducing a temperature of the gases ultimately emitted from an enclosure containing one or more electrochemical cells.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of mitigating a venting and/or thermal runaway event of an electrochemical cell, the method comprising:
   reducing a pressure of a gas emitted from the electrochemical cell;
   reducing a temperature of the gas emitted from the electrochemical cell as a result of the reduction of pressure of the gas such that the temperature of the gas is less than an auto-ignition temperature of the gas;
   exposing the gas emitted from the electrochemical cell to at least one catalyst prior to flowing the gas through an outlet of an enclosure that the electrochemical cell is located in;
   rupturing one or more seals above a threshold pressure, wherein the one or more seals seal a catalyst of the at least one catalyst under a non-oxidizing atmosphere; and
   flowing the gas at the reduced pressure and temperature through the outlet of the enclosure that the electrochemical cell is located in,
   wherein reducing the pressure and the temperature of the gas comprises flowing the gas through at least one flow restriction arranged between an interior chamber of the enclosure and the outlet of the enclosure, and wherein the pressure of the gas is reduced by a factor between or equal to 5 and 20.

2. The method of claim 1, wherein the temperature of the gas is reduced by a factor between or equal to 2 and 5.

3. The method of claim 1, further comprising flowing the gas through a tortuous flow path between the interior chamber of the enclosure and the outlet.

4. The method of claim 3, further comprising redirecting the gas from a predetermined venting direction of the electrochemical cell towards an inlet to the flow path extending from the interior chamber to the outlet.

5. The method of claim 1, further comprising exposing the gas emitted from the electrochemical cell to at least one catalyst located upstream from the at least one flow restriction prior to flowing the gas through the outlet, and wherein the at least one catalyst.

6. The method of claim 1, further comprising exposing the gas emitted from the electrochemical cell to at least one catalyst located downstream from the at least one flow restriction prior to flowing the gas through the outlet.

7. A method of mitigating a venting and/or thermal runaway event of an electrochemical cell, the method comprising:

reducing a pressure and a temperature of a gas emitted from the electrochemical cell such that the temperature of the gas is less than an auto-ignition temperature of the gas;

rupturing one or more seals above a threshold pressure, wherein the one or more seals seal a catalyst under a non-oxidizing atmosphere;

exposing the gas to the catalyst; and flowing the gas at the reduced pressure and temperature through an outlet of an enclosure that the electrochemical cell is located in, wherein reducing the pressure and the temperature of the gas comprises flowing the gas through at least one flow restriction arranged between an interior chamber of the enclosure and the outlet of the enclosure.

8. The method of claim 7, wherein the at least one catalyst catalyzes lithium.

9. The method of claim 7, further comprising exposing the gas emitted from the electrochemical cell to the catalyst upstream from the at least one flow restriction.

10. The method of claim 7, further comprising exposing the gas emitted from the electrochemical cell to the catalyst downstream from the at least one flow restriction.

11. The method of claim 7, wherein the pressure of the gas is reduced by a factor between or equal to 5 and 20.

12. The method of claim 7, wherein the temperature of the gas is reduced by a factor between or equal to 2 and 5.

13. A method of mitigating a venting and/or thermal runaway event of an electrochemical cell, the method comprising:

reducing a pressure of a gas emitted from the electrochemical cell;

reducing a temperature of the gas emitted from the electrochemical cell such that the temperature of the gas is less than an auto-ignition temperature of the gas;

exposing the gas emitted from the electrochemical cell to at least one catalyst prior to flowing the gas through an outlet of an enclosure that the electrochemical cell is located in;

rupturing one or more seals above a threshold pressure, wherein the one or more seals seal a catalyst of the at least one catalyst under a non-oxidizing atmosphere; and flowing the gas at the reduced pressure and temperature through the outlet of the enclosure that the electrochemical cell is located in, wherein reducing the pressure and the temperature of the gas comprises flowing the gas through at least one flow restriction arranged between an interior chamber of the enclosure and the outlet of the enclosure, and wherein an inner diameter of the at least one flow restriction is between or equal to about 0.020 inches and 0.030 inches.

14. The method of claim 13, wherein the pressure of the gas is reduced by a factor between or equal to 5 and 20.

15. The method of claim 13, wherein the temperature of the gas is reduced by a factor between or equal to 2 and 5.

16. The method of claim 13, further comprising flowing the gas through a tortuous flow path between the interior chamber of the enclosure and the outlet.

17. The method of claim 16, further comprising redirecting the gas from a predetermined venting direction of the electrochemical cell towards an inlet to the flow path extending from the interior chamber to the outlet.

* * * * *